(12) United States Patent
Kristen et al.

(10) Patent No.: US 6,433,111 B1
(45) Date of Patent: Aug. 13, 2002

(54) METHOD FOR PRODUCING A SUPPORTED CATALYST SYSTEM

(75) Inventors: Marc Oliver Kristen, Limburgerhof; Heike Gregorius, Bad Kreuznach; Ursula Rief, Heddesheim, all of (DE)

(73) Assignee: Basell Polyolefine GmbH, Kehl (DE)

( * ) Notice: Subject to any disclaimer, the term of this patent is extended or adjusted under 35 U.S.C. 154(b) by 0 days.

(21) Appl. No.: 09/719,811

(22) PCT Filed: Jun. 12, 1999

(86) PCT No.: PCT/EP99/04054
§ 371 (c)(1),
(2), (4) Date: Dec. 18, 2000

(87) PCT Pub. No.: WO99/67302
PCT Pub. Date: Dec. 29, 2000

(30) Foreign Application Priority Data

Jun. 25, 1998 (DE) .......................................... 198 28 271

(51) Int. Cl.[7] .......................... C08F 4/605; C08F 4/615; C08F 10/00
(52) U.S. Cl. ........................ 526/141; 526/129; 526/133; 526/142; 526/160; 526/351; 526/352; 526/348; 526/943; 502/120; 502/123; 502/126; 502/132; 502/152; 502/154
(58) Field of Search ................................ 526/129, 133, 526/160, 141, 142, 351, 352, 348, 120, 123, 126, 132, 152, 154

(56) References Cited

U.S. PATENT DOCUMENTS

| 4,404,344 A | 9/1983 | Sinn |
| 5,908,903 A | 6/1999 | Roesch |

FOREIGN PATENT DOCUMENTS

| CA | 2246360 | 8/1997 |
| DE | 197 57540 | 6/1999 |
| EP | 277 004 | 8/1988 |
| EP | 619 326 | 10/1994 |
| EP | 771 822 | 5/1997 |
| WO | 95/13871 | 5/1995 |

*Primary Examiner*—David W. Wu
*Assistant Examiner*—Caixia Lu
(74) *Attorney, Agent, or Firm*—Keil & Weinkauf

(57) ABSTRACT

In a process for preparing a supported catalyst which comprises the following steps:

A) reacting an inorganic support material with an organometallic compound I

B) reacting the support material obtained as described in A) with a metallocene complex and a compound capable of forming metallocenium ions and C) subsequently reacting the resulting material with an organometallic compound II, the supported catalyst obtained in this way or its precursor is brought into contact with a Lewis base in an amount of from 0.1 to <10 mole per mole of metallocene complex.

9 Claims, No Drawings

METHOD FOR PRODUCING A SUPPORTED CATALYST SYSTEM

The present invention relates to a process for preparing a supported catalyst, which comprises the following steps:
A) reacting an inorganic support material with a metal compound of the formula I $$M^1(R^1)_r(R^2)_s(R^3)_t(R^4)_u \qquad \text{I}$$

where
- $M^1$ is an alkali metal, an alkaline earth metal or a metal of main group III or IV of the Periodic Table,
- $R^1$ is hydrogen, $C_1$–$C_{10}$-alkyl, $C_6$–$C_{15}$-aryl, alkylaryl or arylalkyl each having from 1 to 10 carbon atoms in the alkyl radical and from 6 to 20 carbon atoms in the aryl radical,
- $R^2$ to $R^4$ are hydrogen, halogen, $C_1$–$C_{10}$-alkyl, $C_6$–$C_{15}$-aryl, alkylaryl, arylalkyl, alkoxy or dialkylamino each having from 1 to 10 carbon atoms in the alkyl radical and from 6 to 20 carbon atoms in the aryl radical,
- r is an integer from 1 to 4 and
- s,t and u are integers from 0 to 3, where the sum r+s+t+u corresponds to the valence of $M^1$, B) reacting the material obtained as described in A) with a metallocene complex and a compound capable of forming metallocenium ions and C) subsequently reacting the resulting material with a metal compound of the formula II $$M^2(R^5)_o(R^6)_p(R^7)_q \qquad \text{II}$$

where
- $M^2$ is an alkali metal, an alkaline earth metal or a metal of main group III of the Periodic Table,
- $R^5$ is hydrogen, $C_1$–$C_{10}$-alkyl, $C_6$–$C_{15}$-aryl, alkylaryl or arylalkyl each having from 1 to 10 carbon atoms in the alkyl radical and from 6 to 20 carbon atoms in the aryl radical,
- $R^6$ and $R^7$ are hydrogen, halogen, $C_1$–$C_{10}$-alkyl, $C_6$–$C_{15}$-aryl, alkylaryl, arylalkyl or alkoxy each having from 1 to 10 carbon atoms in the alkyl radical and from 6 to 20 carbon atoms in the aryl radical,
- o is an integer from 1 to 3 and
- p and q are integers from 0 to 2, where the sum o+p+q corresponds to the valence of $M^2$.

The invention further relates to a supported catalyst system which is obtainable by the process of the present invention and also to the use of this catalyst system for the homopolymerization of ethylene or propylene or the copolymerization of ethylene or propylene with $C_3$–$C_{10}$-α-olefins and for the gas-phase polymerization of olefins.

Particularly for the gas-phase polymerization and the suspension polymerization of ethylene and higher α-olefins, preference is given to using supported catalyst systems. Supported metallocene catalysts in particular give polymer products having extraordinary material properties.

Many metallocene complexes require activation to develop their full catalytic activity. As activator compounds, use is usually made of aluminoxanes (see, for example, EP-B1-035 242) or compounds which convert the metallocene into a metallocenium cation and stabilize this coordinatively unsaturated cationic structure by means of a suitable noncoordinating counterion (see, for example, EP-A-277 004).

The productivity of these catalyst systems and thus their economical usability depends significantly on the type of support material and, in particular, on the method of application to the support. A very efficient method of applying, in particular, cationically activatable metallocene catalyst systems to a support is described in DE-A 19 606 167.

To increase the productivity of cationically activated metallocene catalysts, weakly coordinating Lewis bases are added to such catalyst systems (cf. EP-B1-0648 786 and EP-A1-0 771 822). However, these catalyst systems are mostly homogeneous, unsupported catalyst systems. The Lewis base is always used in an at least 10-fold molar excess relative to the metallocene complex, as a rule in a 50- to 250-fold excess. Although EP-A-0 771 822 states that the metallocene complex can also be applied to a support, the Lewis base is always added to the polymerization mixture in a soluble form and in a considerable excess.

Since relatively high concentrations of the Lewis bases added have an inhibiting effect on the metallocene catalysts and, in addition, represent an undesirable extractable component in the polymer, it would be desirable to reduce the Lewis base concentration while retaining the positive effect of these compounds on the catalyst productivity.

It is an object of the present invention to find a process for preparing a supported metallocene catalyst system which no longer has the disadvantages of the prior art and displays a high productivity when small amounts of Lewis bases are added.

We have found that this object is achieved by the process described at the outset for preparing a supported catalyst when the supported catalyst obtained in this way or its precursor is brought into contact with a Lewis base in an amount of from 0.1 to <10 mole per mole of metallocene complex.

Furthermore, we have found a supported catalyst system which is obtainable by this process and also the use of this supported catalyst system in the homopolymerization and copolymerization of olefins.

The supported catalyst systems of the present invention are obtainable by, in a first step A), reacting an inorganic support material with a metal compound of the formula I.

Support materials used are preferably finely divided solids whose particle diameters are in the range from 1 to 200 µm, in particular from 30 to 70 µm.

Suitable support materials are, for example, silica gels, preferably those of the formula $SiO_2 \cdot a\, Al_2O_3$, where a is a number from 0 to 2, preferably from 0 to 0.5; these are thus aluminosilicates or silicon dioxide. Such products are commercially available, e.g. silica gel 332 from Grace. These support materials can be subjected to a thermal treatment to remove the adsorbed water or can be calcined; preference is given to carrying out a treatment at 80–200° C., preferably 100–150° C.

Other inorganic compounds such as $Al_2O_3$ or $MgCl_2$ or mixtures comprising these compounds can likewise be used as support materials.

Among the metal compounds of the formula I, preference is given to those in which $M^1$ is a metal of main group III of the Periodic Table, in particular aluminum, $R^1$ is $C_1$–$C_{10}$-alkyl and $R^2$ to $R^4$ are $C_1$–$C_{10}$-alkyl. In the particularly preferred case of $M^1$ being aluminum, u is zero and the radicals $R^1$ to $R^3$ are, in particular, identical, preferably methyl, ethyl, isobutyl or hexyl, preferably isobutyl.

The metal compound of the formula I is preferably added as solution to a suspension of the support. Suitable solvents or suspension media are, in particular, hydrocarbons such as heptane. The amount of metal compound I can vary within wide limits and the minimum amount depends on the number of hydroxy groups in the support. The temperatures, reaction times and pressures are not critical per se; preference is given to temperatures of from 0 to 80° C. and reaction times of from 0.1 to 48 hours.

It has been found to be useful to remove the excess metal compound I by washing after the pretreatment of the support, for example using hydrocarbons such as pentane or hexane, and to dry the support.

The material prepared in this way can be stored for up to 6 months and is not pyrophoric.

This material is then, in a further step B), reacted with a metallocene complex and a compound capable of forming metallocene ions.

Suitable metallocene complexes are, for example, compounds of the formula III:

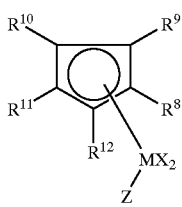

III where the substituents have the following meanings:

M is titanium, zirconium, hafnium, vanadium, niobium or tantalum,

X is fluorine, chlorine, bromine, iodine, hydrogen or $C_1$–$C_{10}$-alkyl, preferably chlorine, $R^8$ to $R^{12}$ are hydrogen, $C_1$–$C_{10}$-alkyl, 5- to 7-membered cycloalkyl which may in turn bear a $C_1$–$C_{10}$-alkyl group as substituent, $C_6$–$C_{15}$-aryl or arylalkyl, where two adjacent radicals may also together be a cyclic group having from 4 to 15 carbon atoms, or $Si(R^{13})_3$ where $R^{13}$ is $C_1$–$C_{10}$-alkyl, $C_3$–$C_{10}$-cycloalkyl or $C_6$–$C_{15}$-aryl, Z is X or

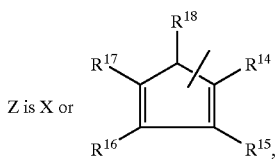

where the radicals $R^{14}$ to $R^{18}$ are hydrogen, $C_1$–$C_{10}$-alkyl, 5- to 7-membered cycloalkyl which may in turn bear a $C_1$–$C_{10}$-alkyl group as substituent, $C_6$–$C_{15}$-aryl or arylalkyl, where two adjacent radicals may also together be a cyclic group having from 4 to 15 carbon atoms, or $Si(R^{19})_3$ where $R^{19}$ is $C_1$–$C_{10}$-alkyl, $C_6$–$C_{15}$-aryl or $C_3$–$C_{10}$-cycloalkyl, or the radicals $R^{11}$ and Z together form an —$R^{20}$—A— group, where

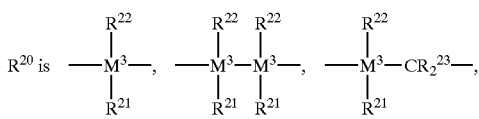

-continued

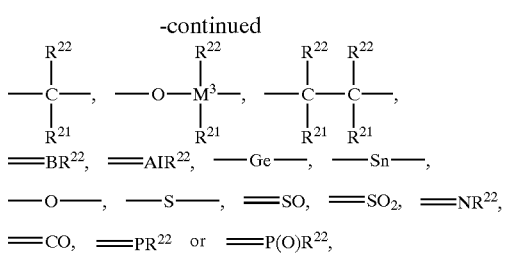

where $R^{21}$, $R^{22}$ and $R^{23}$ are identical or different and are each a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group or two adjacent radicals in each case together with the atoms connecting them form a ring, and $M^3$ is silicon, germanium or tin,

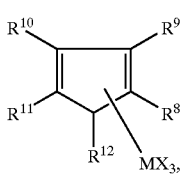

$R^{24}$ is $C_1$–$C_{10}$-alkyl, $C_6$–$C_{15}$-aryl, $C_3$–$C_{10}$-cycloalkyl, alkylaryl or $Si(R^{25})_3$, $R^{25}$ is hydrogen, $C_1$–$C_{10}$-alkyl, $C_6$–$C_{15}$-aryl which may in turn bear $C_1$–$C_4$-alkyl groups as substituents or $C_3$–$C_{10}$-cycloalkyl or the radicals $R^{11}$ and $R^{17}$ together form an —$R^{20}$— group.

Among the metallocene complexes of the formula III, preference is given to

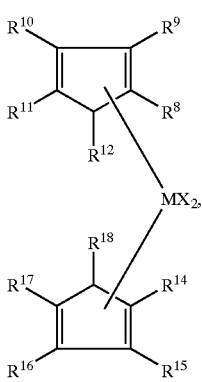

IIIa

IIIb

-continued

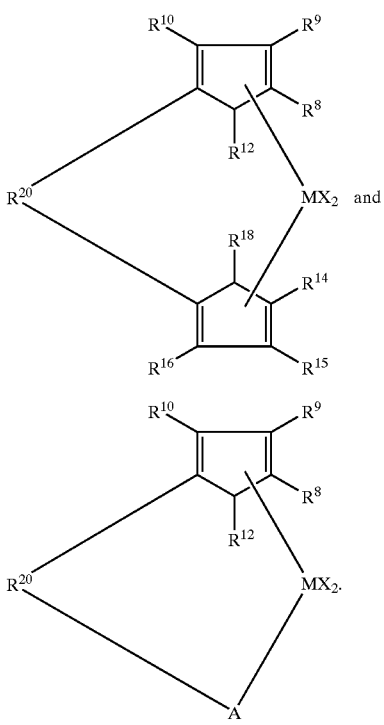

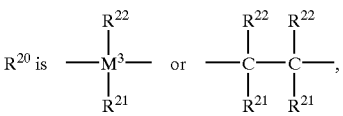

The radicals X can be identical or different, but are preferably identical.

Among the compounds of the formula IIIa, particular preference is given to those in which M is titanium, zirconium or hafnium, in particular zirconium, X is chlorine and $R^8$ to $R^{12}$ are hydrogen or $C_1$–$C_4$-alkyl.

Among the compounds of the formula IIIb, preference is given to those in which

M is titanium, zirconium or hafnium, in particular zirconium,

X is chlorine, $R^8$ to $R^{12}$ are hydrogen, $C_1$–$C_4$-alkyl or $Si(R^{13})_3$, $R^{14}$ to $R^{18}$ are hydrogen, $C_1$–$C_4$-alkyl or $Si(R^{19})_3$.

Particularly useful compounds are those of the formula IIIb in which the cyclopentadienyl radicals are identical.

Examples of particularly useful compounds are:
bis(cyclopentadienyl)zirconium dichloride,
bis(pentamethylcyclopentadienyl)zirconium dichloride,
bis(methylcyclopentadienyl)zirconium dichloride,
bis(ethylcyclopentadienyl)zirconium dichloride,
bis(n-butylcyclopentadienyl)zirconium dichloride and
bis(trimethylsilylcyclopentadienyl)zirconium dichloride.

Particularly useful compounds of the formula IIIc are those in which $R^8$ and $R^{14}$ are identical and are hydrogen or $C_1$–$C_{10}$-alkyl groups, $R^{12}$ and $R^{18}$ are identical and are hydrogen or methyl, ethyl, isopropyl or tert-butyl groups $R^9$, $R^{10}$, $R^{15}$ and $R^{16}$ have the meanings $R^{10}$ and $R^{16}$ are $C_1$–$C_4$-alkyl, $R^9$ and $R^{15}$ are hydrogen or two adjacent radicals $R^9$ and $R^{10}$ or $R^{15}$ and $R^{16}$ are together a cyclic group having from 4 to 12 carbon atoms, M is titanium, zirconium or hafnium and
X is chlorine.

Examples of particularly useful complexes are:
dimethylsilanediylbis(cyclopentadienyl)zirconium dichloride,
dimethylsilanediylbis(indenyl)zirconium dichloride,
dimethylsilanediylbis(tetrahydroindenyl)zirconium dichloride,
ethylenebis(cyclopentadienyl)zirconium dichloride,
ethylenebis(indenyl)zirconium dichloride,
ethylenebis(tetrahydroindenyl)zirconium dichloride,
tetramethylethylene-9-fluorenylcyclopentadienylzirconium dichloride,
dimethylsilanediylbis(3-tert-butyl-5-methylcyclopentadienyl)zirconium dichloride,
dimethylsilanediylbis(3-tert-butyl-5-ethylcyclopentadienyl)zirconium dichloride,
dimethylsilanediylbis(2-methylindenyl)zirconium dichloride,
dimethylsilanediylbis(2-isopropylindenyl)zirconium dichloride,
dimethylsilanediylbis(2-tert.butylindenyl)zirconium dichloride,
diethylsilanediylbis(2-methylindenyl)zirconium dibromide
dimethylsilanediylbis(3-methyl-5-methylcyclopentadienyl)zirconium dichloride,
dimethylsilanediylbis(3-ethyl-5-isopropylcyclopentadienyl)zirconium dichloride,
dimethylsilanediylbis(2-methylindenyl)zirconium dichloride,
dimethylsilanediylbis(2-methylbenzindenyl)zirconium dichloride and dimethylsilanediylbis(2-methylindenyl)hafnium dichloride.

Particularly useful compounds of the formula IIId are those in which

M is titanium or zirconium,

X is chlorine,

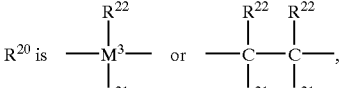

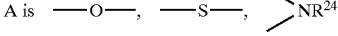

and $R^8$ to $R^{10}$ and $R^{12}$ are hydrogen, $C_1$–$C_{10}$-alkyl, $C_3$–$C_{10}$-cycloalkyl, $C_6$–$C_{15}$-aryl or $Si(R^{14})_3$, or two adjacent radicals are together a cyclic group having from 4 to 12 carbon atoms.

Such complexes can be synthesized by methods known per se, preferably by reacting the appropriately substituted, cyclic hydrocarbon anions with halides of titanium, zirconium, hafnium, vanadium, niobium or tantalum.

Examples of appropriate preparative methods are described, inter alia, in Journal of Organometallic Chemistry, 369 (1989), 359–370.

It is also possible to use mixtures of various metallocene complexes.

Suitable compounds capable of forming metallocenium ions are, in particular, strong, uncharged Lewis acids, ionic compounds containing Lewis acid cations and ionic compounds containing Brönsted acids as cation.

As strong, uncharged Lewis acids, preference is given to compounds of the formula IV $$M^4 X^1 X^2 X^3 \qquad \qquad IV$$

where
- $M^4$ is an element of main group III of the Periodic Table, in particular B, Al or Ga, preferably B,
- $X^1$, $X^2$ and $X^3$ are hydrogen, $C_1$–$C_{10}$-alkyl, $C_6$–$C_{15}$-aryl, alkylaryl, arylalkyl, haloalkyl or haloaryl each having from 1 to 10 carbon atoms in the alkyl radical and from 6 to 20 carbon atoms in the aryl radical or fluorine, chlorine, bromine or iodine, in particular haloaryls, preferably pentafluorophenyl.

Particular preference is given to compounds of the formula IV in which $X^1$, $X^2$ and $X^3$ are identical, preferably tris(pentafluorophenyl)borane.

Suitable ionic compounds containing Lewis acid cations are compounds of the formula V $$[(Y^{a+})Q_1 Q_2 \ldots Q_z]^{d+} \qquad \qquad V$$

where
- Y is an element of main groups I to VI or transition groups I to VIII of the Periodic Table,
- $Q_1$ to $Q_z$ are singly negatively charged groups such as $C_1$–$C_{28}$-alkyl, $C_6$–$C_{15}$-aryl, alkylaryl, arylalkyl, haloalkyl, haloaryl each having from 6 to 20 carbon atoms in the aryl part and from 1 to 28 carbon atoms in the alkyl part, $C_1$–$C_{10}$-cycloalkyl which may bear $C_1$–$C_{10}$-alkyl groups as substituents, halogen, $C_1$–$C_{28}$-alkoxy, $C_6$–$C_5$-aryloxy, silyl or mercaptyl groups,
- a is an integer from 1 to 6,
- z is an integer from 0 to 5 and
- d is the difference a–z, with the proviso that d is greater than or equal to 1.

Particularly suitable Lewis acid cations are carbonium cations, oxonium cations and sulfonium cations and also cationic transition metal complexes. Particular mention may be made of the triphenylmethyl cation, the silver cation and the 1,1'-dimethyl-ferrocenyl cation. They preferably have noncoordinating counterions, in particular boron compounds as are also mentioned in WO 91/09882, preferably tetrakis(pentafluorophenyl)borate.

Ionic compounds containing Brönsted acids as cations and preferably likewise noncoordinating counterions are mentioned in WO 91/09882; the preferred cation is N,N-dimethylanilinium.

Particular preference is given to using aromatic boron compounds as compounds capable of forming metallocenium ions; in particular, use is made of dimethylanilinium tetra(pentafluorophenyl)borate.

The amount of compounds capable of forming metallocenium ions is preferably from 0.1 to 10 equivalents, based on the metallocene complex III.

The conditions for the reaction of the metallocene complex with the compound capable of forming metallocene ions are not critical per se, but preference is given to carrying out the reaction in solution. Suitable solvents are, in particular, hydrocarbons, preferably aromatic hydrocarbons such as toluene.

The material prepared as described in A) is then added to the above mixture. An amount of from 0.1 to 10% by weight of metallocene complex, based on the inorganic support material, is particularly suitable. The conditions for this reaction are likewise not critical; temperatures in the range from 20 to 80° C. and reaction times in the range from 0.1 to 20 hours have been found to be particularly useful.

The material obtained as described in B) can then be isolated and will keep for at least 6 months.

In a further step C), the material obtained as described in B) is reacted with a metal compound of the formula II. If the metallocene complex has been used in its metal dihalide form, this step serves primarily to activate the metallocene complex. However, even in the case of metallocene catalysts used in the active form, contact with a metal compound II is necessary to achieve optimum activity. The activation can be carried out at any point in time, i.e. before, during or after the metering of the material obtained as described in B) into the reactor. The activation is preferably carried out under the material obtained as described in B) has been metered into the reactor.

Among the metal compounds of the formula II $$M^2(R^5)_o(R^6)_p(R^7)_q \qquad \qquad II$$

where
- $M^2$ is an alkali metal, an alkaline earth metal or a metal of main group III of the Periodic Table, i.e. boron, aluminum, gallium, indium or thallium,
- $R^5$ is hydrogen, $C_1$–$C_{10}$-alkyl, $C_6$–$C_{15}$-aryl, alkylaryl or arylalkyl each having from 1 to 10 carbon atoms in the alkyl radical and from 6 to 20 carbon atoms in the aryl radical,
- $R^6$ and $R^7$ are hydrogen, halogen, $C_1$–$C_{10}$-alkyl, $C_6$–$C_{15}$-aryl, alkylaryl, arylalkyl or alkoxy each having from 1 to 10 carbon atoms in the alkyl radical and from 6 to 20 carbon atoms in the aryl radical,
- o is an integer from 1 to 3 and
- p and q are integers from 0 to 2, where the sum o+p+q corresponds to the valence of $M^2$, preference is given to those in which
- $M^2$ is lithium, magnesium or aluminum and
- $R^5$ to $R^7$ are $C_1$–$C_{10}$-alkyl.

Particularly preferred metal compounds of the formula II are n-butyllithium, n-butyl-n-octylmagnesium, n-butyl-n-heptyl-magnesium, triisobutylaluminum, triethylaluminum and tri-n-hexylaluminum.

The conditions for the reaction in step C) are not critical per se. Temperatures, reaction times and pressures depend on the point at which the reaction, i.e. the activation, is carried out.

In the process of the present invention, the supported catalyst or its precursor is brought into contact with a small amount of a Lewis base. The addition of this Lewis base is advantageously carried out at a point which is as early as possible in the preparation of the catalyst. In an advantageous embodiment of the process, the catalyst precursor treated as described in step A) is brought into contact with the Lewis base, i.e. the Lewis base is brought into contact with the catalyst support which has been pretreated with the metal compound of the formula I, before this catalyst precursor is reacted with the metallocene complex. In this way, the Lewis base is effectively applied to a support so that the protective action of the Lewis base on the metallocene complex commences immediately this metallocene complex is applied to the support.

A process in which a metallocene complex is used in its metal dihalide form is particularly advantageous. In this case, it is particularly advantageous for the Lewis base to be brought into contact with the supported catalyst or its precursor before the activation of the metallocene dihalide in step C).

The way in which the Lewis base is added to the supported catalyst or its precursor is, in principle, not critical. In general, the Lewis base is dissolved in an organic solvent such as toluene and this solution is brought into contact with the support material.

The early point of addition of the Lewis base to the supported catalyst or its precursor results in enrichment of the Lewis base on the support surface and thus makes it possible to reduce the amount of Lewis base considerably. An advantageous embodiment of the process provides for the Lewis base to be used in an amount of from 0.3 to <2 mole per mole of metallocene complex. Particular preference is given to a ratio of Lewis base to metallocene complex of from 0.5 to 1.5 mole per mole.

Suitable Lewis bases are compounds of various classes of substance which should have the following properties: they should be able to coordinate weakly to the metal center of the metallocene complex in such a way that they can be displaced from this coordination compound by the olefins to be polymerized. Advantageous compounds which are suitable for use in the process of the present invention are, for example, aromatic amines, alkylarylphenols and also sterically hindered ethers and amines. Among the aromatic amines, particular preference is given to tertiary amines, for example $C_1$–$C_4$-dialkylaniline, in particular dimethylaniline. The aromatic rings of these amines can be substituted by various electron-donating or electron-withdrawing substituents so as to vary the nucleophilicity and thus the coordinating strength of the compounds. The same also applies to alkylarylphenols. The alkylarylphenols usually contain alkyl groups having from one to ten carbon atoms and can likewise be substituted on the aromatic ring. Substituents which have been found to be advantageous are, in particular, electron-withdrawing substituents such as fluorine atoms. An example of a particularly advantageous Lewis base is pentafluoroanisole. As examples of sterically hindered ethers and amines, mention may be made of 2,6-di-tert-butylaniline, 2,2,5,5-tetramethyltetrahydrofuran or 2,5-di-tert-butylfuran.

The supported catalyst system obtainable by the novel process has a higher productivity than similar, known catalyst systems without introducing an appreciable amount of extractable substances into the polymer. The novel supported catalyst system is particularly suitable for use in the homopolymerization of ethylene or propylene or in the copolymerization of ethylene or propylene with $C_3$–$C_{10}$-α-olefins. Possible $C_3$–$C_{10}$-α-olefins are all customary α-olefins as are used as comonomers in the copolymerization with ethylene or propylene. Particular mention may be made of butene, hexene and octene. However, cycloolefins and higher 1-alkenes and also alkenes in general can be used as monomers for homopolymerizations or copolymerizations.

The supported catalyst system of the present invention can be used in various polymerization processes, particularly in suspension and gas-phase processes. Use of the supported catalyst system of the present invention is particularly advantageous in the gas-phase polymerization of olefins. Such gas-phase polymerization processes are known to those skilled in the art. The polymerization can be carried out, for example, in a stirred gas phase, but particularly preferably in a gas-phase fluidized bed.

EXAMPLES

Examples 1–4

6 g of silica gel (ES 70 X, produced by Crosfield) were baked out at 130° C. for 6 hours and then suspended in a toluene solution of triisobutylaluminum (8.5 ml of 2 M solution). After 2 hours, the support material was filtered off and then suspended in 50 ml of toluene. At short intervals, 242 mg of dimethylanilinium tetrakis(pentafluorophenyl)borate, 3 ml of a 0.1 molar solution (0.3 mmol) of N,N-dimethylaniline in toluene and 121 mg of bis(n-butylcyclopentadienyl)zirconium dichloride (0.3 mmol) were added to the suspension. The reaction mixture was heated at 80° C. for 30 minutes while stirring. The solvent was subsequently removed under reduced pressure. This gave the catalyst as a free-flowing powder. Using a method analogous to this preparative procedure, catalysts having the following ratios of Zr, B and dimethylaniline were prepared:

|  | Zr | B | Dimethylaniline |
|---|---|---|---|
| Example 1 | 1 | 1 | 1 |
| Example 2 | 1 | 1 | 0.5 |
| Example 3 | 1 | 1 | 3 |
| Comparative example | 1 | 1 | 0 |

Polymerization of Ethylene

A 10 l steel stirring autoclave was carefully flushed with nitrogen and heated to the polymerization temperature of 70° C., then charged with 4.5 l of isobutane and 150 mg of butyloctyl-magnesium (2 molar solution in heptane). The supported catalyst was then rinsed in using a further 0.5 l of isobutane and the autoclave was pressurized with ethylene to a total pressure of 38 bar. The pressure in the autoclave was kept constant by metering in further amounts of ethylene. After 90 minutes, the polymerization was stopped by venting the autoclave. The polymer was obtained in the form of a free-flowing powder.

| Catalyst from | Productivity (g of polymer/g of catalyst) |
|---|---|
| Example 1 | 5100 |
| Example 2 | 2800 |
| Example 3 | 600 |
| Comparative example | 2400 |

The examples show that even very small amounts of the Lewis base lead to an optimal increase in the productivity.

We claim:
1. A process for preparing a supported catalyst, which comprises the following steps:
A) reacting an inorganic support material with a metal compound of the formula I

$$M^1(R^1)_r(R^2)_s(R^3)_t(R^4)_u \qquad\qquad I$$

where
$M^1$ is an alkali metal, an alkaline earth metal or a metal of main group III or IV of the Periodic Table,
$R^1$ is hydrogen, $C_1$–$C_{10}$-alkyl, $C_6$–$C_{15}$-aryl, alkylaryl or arylalkyl each having from 1 to 10 carbon atoms in the alkyl radical and from 6 to 20 carbon atoms in the aryl radical,
$R^2$ to $R^4$ are hydrogen, halogen, $C_1$–$C_{10}$-alkyl, $C_6$–$C_{15}$-aryl, alkylaryl, arylalkyl, alkoxy or dialkylamino each having from 1 to 10 carbon atoms in the alkyl radical and from 6 to 20 carbon atoms in the aryl radical,
r is an integer from 1 to 4 and
s, t and u are integers from 0 to 3, where the sum r+s+t+u corresponds to the valence of $M^1$, B) reacting the material obtained as described in A) with a metallocene complex and a compound capable of forming metallocenium ions and C) subsequently reacting the resulting material with a metal compound of the formula II $$M^2(R^5)_o(R^6)_p(R^7)_q \qquad \text{II}$$

where
- $M^2$ is an alkali metal, an alkaline earth metal or a metal of main group III of the Periodic Table,
- $R^5$ is hydrogen, $C_1$–$C_{10}$-alkyl, $C_6$–$C_{15}$-aryl, alkylaryl or arylalkyl each having from 1 to 10 carbon atoms in the alkyl radical and from 6 to 20 carbon atoms in the aryl radical,
- $R^6$ and $R^7$ are hydrogen, halogen, $C_1$–$C_{10}$-alkyl, $C_6$–$C_{15}$-aryl, alkylaryl, arylalkyl or alkoxy each having from 1 to 10 carbon atoms in the alkyl radical and from 6 to 20 carbon atoms in the aryl radical,
- o is an integer from 1 to 3 and
- p and q are integers from 0 to 2, where the sum o+p+q corresponds to the valence of $M^2$, wherein the supported catalyst obtained in this way or its precursor is brought into contact with a Lewis base in an amount of from 0.3 to <2 mole per mole of metallocene complex.

2. A process as claimed in claim 1, wherein the catalyst precursor treated as described in step A) is brought into contact with the Lewis base.

3. A process as claimed in claim 1, wherein a metallocene complex in its metal dihalide form is used and the Lewis base is brought into contact with the supported catalyst or its precursor prior to the reaction of step C).

4. A supported catalyst system prepared as claimed in claim 1.

5. A process as claimed in claim 1, wherein a Lewis base selected from the group consisting of aromatic amines, alkylarylphenols and sterically hindered ethers and amines is used.

6. A process as claimed in claim 1, wherein the Lewis base used is dimethylaniline.

7. A process as claimed in claim 1, wherein the compound capable of forming metallocenium ions is an aromatic boron compound.

8. A process for the polymerization of olefins wherein ethylene or propylene or ethylene or propylene and further $C_3$–$C_{10}$-α-olefins are polymerized in the presence of the supported catalyst system of claim 4.

9. A process for the polymerization of olefins as claimed in claim 8, wherein the polymerization is in the gas phase.

* * * * *